(12) United States Patent
Dirk et al.

(10) Patent No.: US 9,102,801 B1
(45) Date of Patent: Aug. 11, 2015

(54) LIGNIN NANOPARTICLE SYNTHESIS

(75) Inventors: Shawn M. Dirk, Albuquerque, NM (US); Kirsten Nicole Cicotte, Albuquerque, NM (US); David R. Wheeler, Albuquerque, NM (US); David A. Benko, Munroe Falls, OH (US)

(73) Assignees: Sandia Corporation, Albuquerque, NM (US); The Goodyear Tire & Rubber Company, Akron, OH (US)

( * ) Notice: Subject to any disclaimer, the term of this patent is extended or adjusted under 35 U.S.C. 154(b) by 175 days.

(21) Appl. No.: 13/597,928

(22) Filed: Aug. 29, 2012

(51) Int. Cl.
*C08H 7/00* (2011.01)
*C07G 1/00* (2011.01)
*C08K 5/315* (2006.01)

(52) U.S. Cl.
CPC . *C08H 6/00* (2013.01); *C08K 5/315* (2013.01)

(58) Field of Classification Search
CPC ............. C08H 6/00; C07G 1/00; C08K 5/315
USPC ...................................... 524/72, 73; 530/505
See application file for complete search history.

(56) References Cited

U.S. PATENT DOCUMENTS

| | | | |
|---|---|---|---|
| 2,575,061 A * | 11/1951 | McMahon | 524/76 |
| 3,296,158 A | 1/1967 | Dimitri et al. | |
| 3,639,617 A * | 2/1972 | King | 514/369 |
| 3,956,261 A | 5/1976 | Lin | |
| 3,984,363 A | 10/1976 | D'Alelio | |
| 4,477,612 A | 10/1984 | Boutsicaris | |
| 4,820,749 A | 4/1989 | Beshay | |
| 5,102,991 A | 4/1992 | Glasser et al. | |
| 7,064,171 B1 | 6/2006 | Halasa et al. | |
| 7,314,505 B1 | 1/2008 | Wheeler et al. | |
| 7,550,071 B1 | 6/2009 | Dirk et al. | |
| 7,955,945 B1 | 6/2011 | Dirk et al. | |
| 8,223,472 B1 | 7/2012 | Dirk et al. | |
| 8,426,321 B1 | 4/2013 | Dirk et al. | |
| 8,427,809 B1 | 4/2013 | Dirk et al. | |
| 8,664,305 B2 | 3/2014 | Benko et al. | |
| 8,703,391 B1 | 4/2014 | Dirk et al. | |
| 2010/0204368 A1 | 8/2010 | Benko et al. | |
| 2013/0338049 A1 * | 12/2013 | King et al. | 508/181 |

FOREIGN PATENT DOCUMENTS

| | | |
|---|---|---|
| JP | 5-331319 | 12/1993 |
| JP | 2008-308615 | 12/2008 |
| WO | WO 2005/002530 A1 | 1/2005 |

OTHER PUBLICATIONS

Nenkova et al. New Anti-exhauster for Elastomeric Compositions. Doklady Bolgarskoi Akademii Nauk (1984), 37(8), 1059-60.*

(Continued)

*Primary Examiner* — John Uselding
(74) *Attorney, Agent, or Firm* — Helen S. Baca

(57) ABSTRACT

A method including reducing a particle size of lignin particles to an average particle size less than 40 nanometers; after reducing the particle size, combining the lignin particles with a polymeric material; and forming a structure of the combination. A method including exposing lignin to a diazonium precursor including a functional group; modifying the lignin by introducing the functional group to the lignin; and combining the modified lignin with a polymeric material to form a composite. An apparatus including a composite of a polymer and lignin wherein the lignin has an average particle size less than 100 micrometers.

19 Claims, 1 Drawing Sheet

(56) References Cited

OTHER PUBLICATIONS

Achyuthan, K.E., et al., "Supramolecular self-assembled chaos: polyphenolic lignin's barrier to cost-effective lignocellulosic biofuels," ISSN 1420-3049 www.mdpi.com/journal/molecules; Molecules, 15, pp. 8641-8688; (2010).

Pandey, D., et al. "UHV STM I(V) and XPS studies of aryl diazonium molecules assembled on Si(111)," Am. Chem. Soc., Langmuir, 23, pp. 4700-4708 (2007).

Stewart, M.P., et al., "Direct covalent grafting of conjugated molecules onto Si, GaAs, and Pd surfaces from aryldiazonium salts," J. Am. Chem. Soc., 126, pp. 370-378 (2004).

Cazacu G et al., "Polyolefin/lignosulfonate blends, 9: Functionalized polyolefin/lignin blends," *Macromolec. Mater. Eng.* Oct. 2004;289(10):880-9.

Gregorová A et al., "Stabilization effect of lignin in natural rubber," *Polym. Degrad. Stability* Feb. 2006;91(2):229-33.

Košíková B et al., "Role of lignin filler in stabilization of natural rubber-based composites," *J. Appl. Polym. Sci.* Jan. 2007;103(2):1226-31.

Kumaran MG et al., "Utilization of lignins in rubber compounding," *J. Appl. Polym. Sci.* Jul. 1978;22(7):1885-93.

Setua DK et al., "Lignin reinforced rubber composites," *Polym. Composites* Dec. 2000;21(6):988-95.

\* cited by examiner

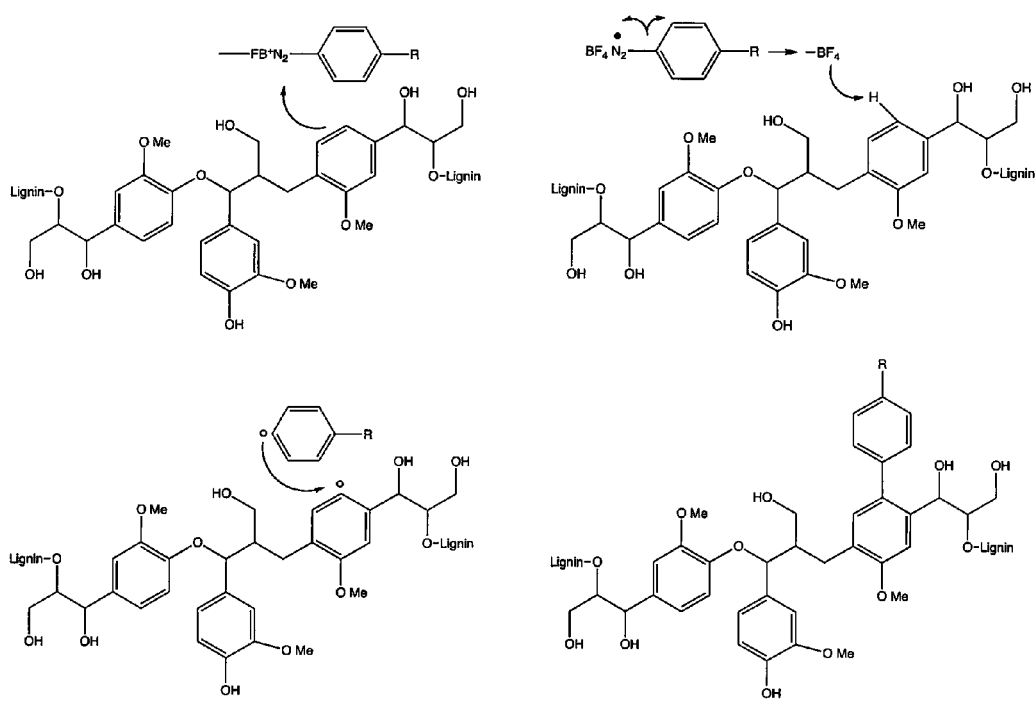

LIGNIN NANOPARTICLE SYNTHESIS

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

Lignin composites.

BACKGROUND

Modern tires are generally made of synthetic rubber, natural rubber, fabric and wire, along with other materials and/or fillers that reinforce the rubber. Tires consist of a tread and a body. The tread provides traction while the body ensures support. The majority of tires are pneumatic inflatable structures, including a doughnut-shaped body of cords and wires encased in rubber and generally filled with compressed air to form an inflatable cushion. Pneumatic tires are used on many types of vehicles, such as cars, bicycles, motorcycles, trucks, earthmovers, and aircraft.

Carbon black is a by-product produced by the incomplete combustion of heavy petroleum products such as fluid catalytic cracking (FCC) tar, coal tar, ethylene cracking tar, and a small amount from vegetable oil. Carbon black is a form of amorphous carbon that has a relatively high surface-area-to-volume ratio. Carbon black is used as a filler in plastic and rubber, principally pigment and reinforcement properties, particularly as a reinforcing filler in rubber products, especially tires. While a pure gum vulcanizate of styrene-butadiene (synthetic rubber) has a tensile strength on the order of up to 2.5 megapascals (MPa), it has very little abrasion resistance. Compounding the vulcanizate with carbon black improves its tensile strength and wear resistance. Over five million metric tons of carbon black is used each year in the tire industry with a typical tire containing between 30 to 35 percent carbon black. Carbon black is also used in other automotive products (e.g., belts, hoses), in the Aerospace industry in elastomers for aircraft vibration control components such as engine mounts, and in various other plastic products.

Lignin is a biopolymer found in woody plants. Lignin may be defined as an amorphous, polyphenolic material produced from enzymatic dehydrogenative polymerization of generally three principal phenylpropanoid monomers: (1) p-coumaryl alcohol, (2) coniferyl alcohol and (3) sinapyl alcohol.

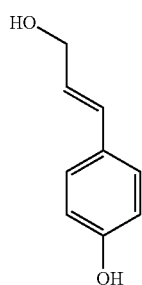

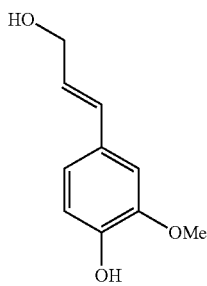

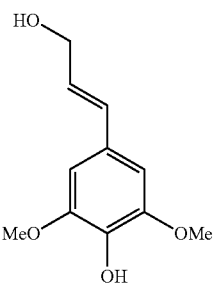

An example of the polycondensation of coniferyl alcohol (2) is:

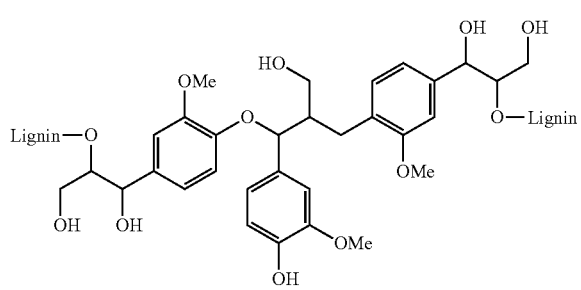

Lignin is produced generally as a by-product in wood processing. For example, lignin is typically required to be removed from wood pulp when the wood pulp is used for papermaking.

In practice, lignin may be recovered from wood pulp by various processes and thus, the nature of an individual lignin depends somewhat upon its plant of origin and recovery process. Examples of lignin recovery processes include by solvent extraction from wood meal, (e.g., "native lignin" or "Brauns lignin"); by cellulolytic enzyme treatment of finely ground wood meal followed by solvent extraction (e.g., cellulolytic enzyme lignin); by treatment of woody material with dioxane/dilute HCl (e.g., dioxane acidolysis lignin); by solvent extraction and purification of finely ground wood meal (e.g., milled wood lignin); by strong acid degradation of woody materials (e.g., Klason lignin); by successive treatments of woody material with sodium periodate followed by boiling water (e.g., periodate lignin); by reaction with sodium hydroxide and $Na_2S$ at an elevated temperature followed by isolation through acidification or ultrafiltration (e.g., Kraft lignin); and by reaction with sulfur dioxide and metal bisulfite in an acidic medium and at an elevated temperature (e.g., lignosulfonates). In a lignosulfonate process, lignin is made soluble by sulfonation at benzyl alcohol, benzyl aryl ether and benzyl ether linkages of phenyl propane units. Lignosulfonates may then be isolated by the addition of a base such as sodium hydroxide, magnesium hydroxide, calcium hydroxide and ammonia. Lignosulfonates have been proposed for use as a filler for tires and as a substitute for carbon black.

SUMMARY

A method of forming a composite structure including lignin particles and a polymer is described. In one embodiment, the lignin particles have an average particle size of less than 40 nanometers and, in another embodiment, an average particle size of 10 nanometers or less. A method of reducing lignin particles by mechanical means (e.g., ball milling) is also described. Commercially available lignin is generally comprised of lignin particles having an average particle size on the order of 1 micrometer to 200 micrometers or more. Reducing the particle size to less than 40 nanometers and, in another embodiment, to 10 nanometers or less, will increase the surface area of the lignin particles and improve its dispersive property with a polymer in a composite structure. Where the composite structure is a tire and the polymer is synthetic or natural rubber, lignin particles of a reduced particle size will have improved interaction with the synthetic or natural rubber and possible additional components (e.g., carbon black) to, in one embodiment, improve the reinforcing property of the lignin and optional other components in the tire. In other embodiments, the reduced sized lignin particles may be combined with other polymeric materials as a reinforcing agent in the formation of other structures including, but not limited to, synthetic plastics (e.g., molded plastic structures) and biocompatible synthetic or biopolymers in medical applications (e.g., drug delivery devices or drug delivery agents).

In another embodiment, a method of forming a modified lignin is described as is forming a composite with a modified lignin and a polymer. A modified lignin, in one embodiment, can be made to have an increased solubility in organic solvents and may also increase its dispersive property (i.e., its blend inclusion) with a polymeric material.

An apparatus is also described. In one embodiment, the apparatus includes a polymer and lignin wherein the lignin has an average particle size of less than 40 nanometers and, in another embodiment, an average 10 nanometers or less. A representative polymer may be synthetic rubber and a representative composite may be a tire. Still further, the lignin may be modified to impart functional groups to the lignin to increase its solubility and/or its dispersive properties with the polymer.

BRIEF DESCRIPTION OF THE DRAWINGS

The embodiments are illustrated by way of example and not by way of limitation in the FIGURES of the accompanying drawing in which like references indicate similar elements. It should be noted that references to "an" or "one" embodiment in this disclosure are not necessarily to the same embodiment, and they mean at least one.

FIG. 1 shows a possible reaction mechanism of lignin with a diazonium salt to impart functionality to the lignin.

DETAILED DESCRIPTION

As noted above, commercially available lignin particles such as lignosulfonates typically have an average particle size on the order of 1 to 200 microns. When combined with a polymer such as synthetic rubber (e.g., styrene-butadiene), particles of this size tend to agglomerate which can reduce a tensile stress of a composite.

In one embodiment, lignin having an average particle size of less than 40 nanometers and, in another embodiment, having an average particle size of 10 nanometers or less is described. Prior art techniques for reducing a particle size of lignin relied on chemical mechanisms (e.g., acid digestion). In one embodiment, a technique for reducing the size of a lignin particle from, for example, 1 to 200 microns or less than 40 nanometers (e.g., 10 nanometers or less) is mechanical means such as ball milling. Representatively, the lignin particles are exposed to mechanical degradation through a ball milling process that results in particles of smaller size. One suitable ball milling process is exposing 100 g of a commercially available lignin, such as lignosulfonates commercially available as Vanisperse CB from Borregaard Ligonotech, to zirconite balls (e.g., one centimeter diameter) in a batch process. For a starting lignin material of lignosulfonate, a mechanical degradation process such as ball milling also tends to remove sulfonate groups from the lignin which tends to increase a solubility of the reduced-size lignosulfonate particles in organic solutions. The increased solubility greatly improves dispersion (blend inclusion) within, for example, a polymer, including but not limited to, natural or synthetic rubber (e.g., styrene butadiene).

The following example describes two representative ball milling processes using different ball-based mills.

(1) Lignosulfonate (1 g) was dried at 150° C. overnight to remove any residual moisture. The lignin was then transferred to a Wig-L-Bug mill and milled for 4 minutes. The mill operated with the sample vial swinging in a 6.5° arc at 3200 rpm. The dark black/brown lignin was a light brown color and very soluble in toluene.

(2) Lignosulfonate (100 g) was dried at 150° C. overnight to remove any residual moisture. The lignin was then transferred to the grinding reservoir of a planetary mill (Restec p100) (500 ml Y Zr O2). Grinding medium was added such that the volume was equal to half of the lignin. The mill was operated at 650 rpm for 24 hours. The direction of milling was reversed every minute. The dark black/brown lignin was a light brown color and very soluble in in toluene.

In one embodiment, the lignin particles having an average particle size of less than 40 nanometers such as lignin particles having an average particle size of 10 nanometers or less is combined with styrene-butadiene and/or other elastomers in a composite to form a tire. The lignin may be the only filler combined with styrene-butadiene (e.g., in a range of 10 parts by weight lignin per 100 parts by weight elastomer(s) ("phr") to 60 phr). In another embodiment, lignin may be combined with another filler material such as carbon black. Carbon black contains graphite which has a layered planar structure with each layer having carbon atoms arranged in a hexagonal lattice. The hexagonal lattice arrangement creates step edges in the graphite structures. The polymer chains of the lignin are attracted to the step edges and, without wishing to be bound by theory, interact with the graphite. Reducing a particle size of lignin particles to an average particle size of less than 40 nanometers, increases the surface area of the lignin. The increased surface area increases interaction with the graphite of carbon black, which increases the dispersibility of the lignin in the composite as well as the reinforcement property of the two fillers. Representative combinations of lignin with carbon black in a composite with styrene-butadiene and/or other elastomers to form a tire are a ratio of 10 percent to 90 percent by weight lignin to carbon black and representative ranges of the combination filler to elastomer(s) is 10 phr to 60 phr.

During the mechanical size reduction process (e.g., ball milling process) or after such process, the lignin particles may be functionalized. Resident moieties of lignin include at least one of hydroxyl, methoxyl, carbonyl, and carboxy moieties as well as aromatic moieties and may or may not contain a sulfonate group. Functionalized lignin is described in U.S. patent application Ser. No. 12/684,231 (published as Publication No. 2010/0204368), titled "Functionalized Lignin, Rubber Containing Functionalized Lignin and Products Containing Such Rubber Composition," which is incorporated herein by reference. Such functionalized lignin may be obtained, for example, by esterification of the lignin to form lignin ester and by silylation of one or more of the resident moieties to form silylated lignin. In general, an ester or acrylate capping agent reacts with resident moieties, particularly, hydroxyl groups, of the lignin to form the functionalized lignin. The following illustrates the reaction of a lignin (a polycondensation of coniferyl alcohol) with a hexanoic ester capping agent. The illustration shows the capping agent reacts with residual hydroxyl moieties of the lignin.

A starting material of a lignosulfonate (e.g., Vanisperse CB) containing sulfonate constituents and one or more resident methoxyl, carbonyl and carboxy groups may be esterified via a Lewis acid reaction by an ester capping agent (e.g., acidic anhydride, valeric anhydride, hexanoic anhydride) in the presence of a catalyst (e.g., a zinc chloride catalyst). Alternatively, an esterification of lignosulfonate may be achieved through a transesterification reaction with, for example, ethyl acetate, glycerol triacetate, or methyl caprate in the presence of a catalyst (e.g., p-toluene sulfonic acid). Further, functionalized lignin may be prepared by esterifying a lignosulfonate with methyl esters, methyl caprate or methyl laurate.

A functionalized lignin in a form of a silylated lignin may be prepared by reacting a lignosulfonate with a capping agent

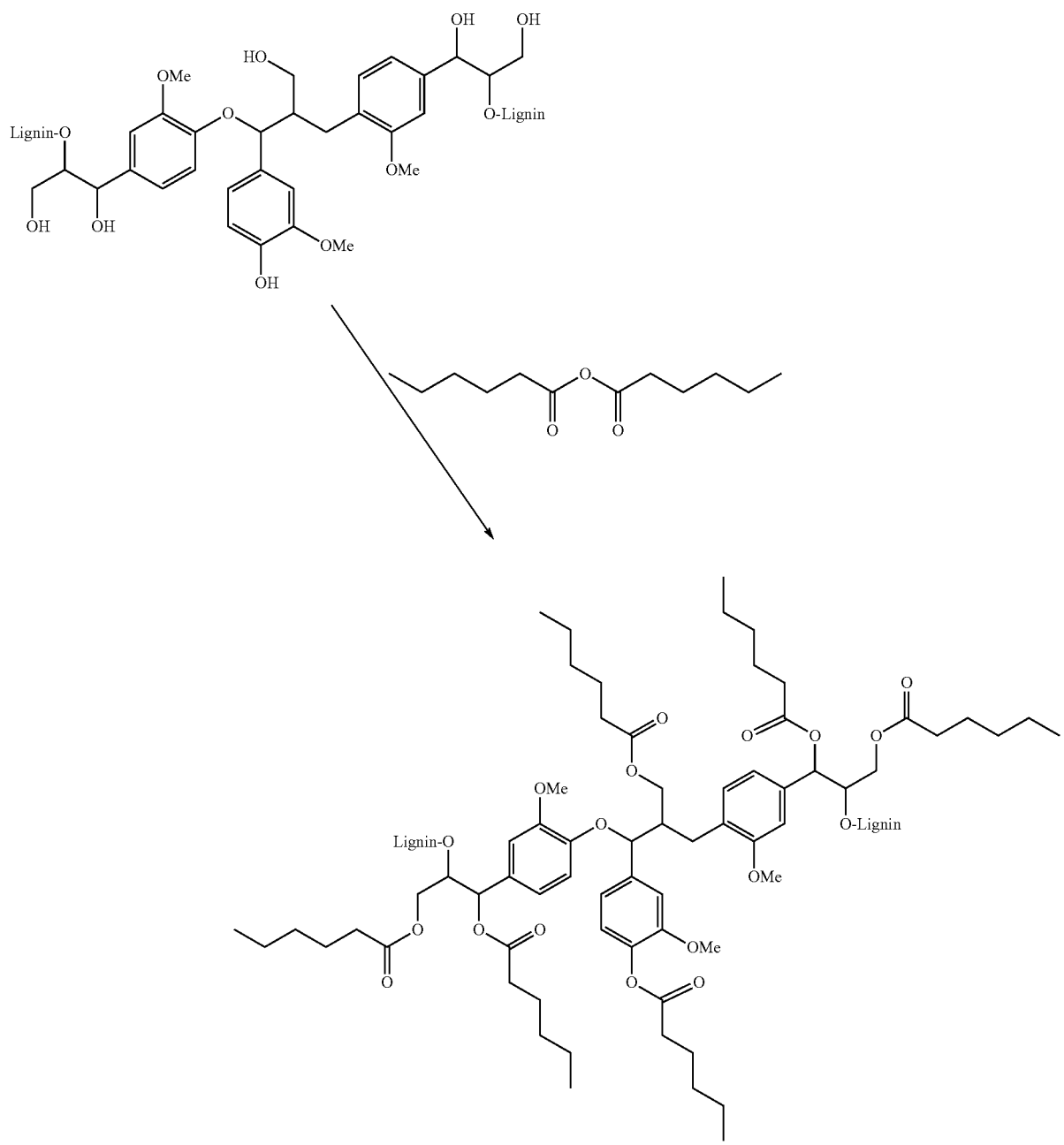

that is in the form of an alkoxysilane or an organoalkosilane, such as alkylalkoxysilane or arylalkoxysilane, or arylalkylalkoxysilane. Functionalized lignin in a form of silylated lignin may be prepared by reacting a lignosulfonate with a capping agent such as isobutyltrimethoxysilane, 3-(trimethoxysilyl)propane-1-thiol, or 3-(dimethoxysilyl)propane-1-thiol in a solvent (e.g., a toluene solvent). The following illustrates the reaction of a lignin (a polycondensation of conferyl alcohol) with 3-(trimethoxysilyl)propane-1-thiol capping agent. The illustration shows the capping agent reacts with residual hydroxyl moieties of the lignin.

ization objectives may also be achieved. Such modification of lignin may be applied to commercially available lignin or lignin that has been reduced in particle size by a mechanical means such as the particle sizes on the order of 40 nanometers or less (e.g., on the order of 10 nanometers or less) through a mechanical process such as ball milling as described above. The lignin can be functionalized with diazonium salts while milling as well.

In one embodiment, functionalization of lignin is achieved by exposing a lignin starting material (e.g., commercially available lignin or lignin reduced in particle size as described

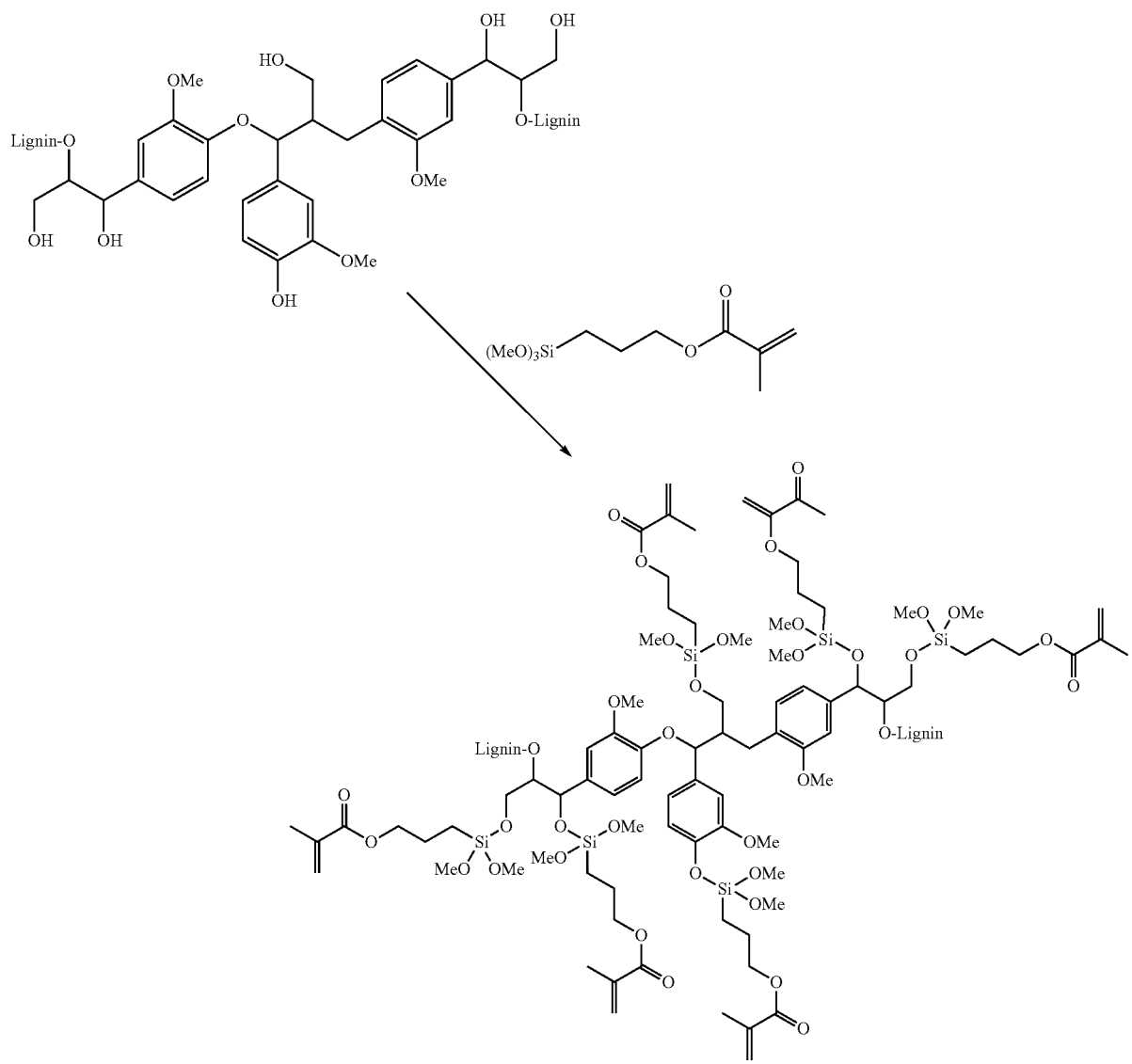

As noted above, functionalization of lignin with an ester or silylation capping agent may occur while the particle size of the lignin is being reduced or after a reduction to less than 40 nanometers.

In another embodiment, a functionalized lignin may be prepared by modifying the lignin with diazonium salts. Such functionalization of lignin may include functionalization to increase solubility in organic solvents and/or to dispersion properties (e.g., increased blend inclusion) with organic polymers in combinations to form composites. Other functional-above and/or previously functionalized with an ester or silylation capping agent) to a diazonium salt in solution with an electrolyte such as a tetrabutylammonium cation. The diazonium salt is reduced by electrons in the lignin structure, particularly the aryl groups in the lignin. Without wishing to be bound by theory, it is believed the functionalization process proceeds as illustrated in FIG. 1. Exposing lignin to an organic diazonium salt such as an organic aryl diazonium with a tetrabutyl ammonium fluoride counterion produces an electron transferred from an aryl group in the lignin and generates an aryl radical upon loss of $N_2$. A proton is also generated that eliminates $HBF_4$. The aryl radical covalently bonds to the aryl group of the lignin to functionalize the lignin.

The following example describes two representative diazotization processes using two different acids.

(1) Lignosulfonate (1.0 g) and distilled $H_2O$ (~50 ml) were combined in a 100 mL round bottom flask equipped with stir bar. Sulfuric acid (50% w/w) was added followed by the addition of 4-nitrophenyl diazonium tetrafluoroborate (0.1 g, 0.42 mmol). The reaction was allowed to stir at room temperature (RT) overnight and filtered and dried. The diazotized lignin had greatly improved solubility in toluene.

(2) Lignosulfonate (1.0 g) and hydrophosphorous acid solution 50% (w/w) (0.007 ml, 0.14 mmol) were added to a 100 ml round bottom flask equipped with stir bar. 4-Nitrophenyl diazonium tetrafluoroborate (0.03 g, 0.14 mmol) was then added to the reaction flask. The reaction mixture was allowed to stir at RT overnight. A small amount of ethanol was added and then modified lignin was precipitated in hexanes. The diazotized lignin had greatly improved solubility in toluene.

The modification introduces functionality to the lignin and can be a method to impart functional groups like olefins, epoxides, esters, acrylates, halides, thiols, carbonates, nitriles and carboxylic acids to the lignin. Increasing an amount of diazonium precursor increases such lignin functionality. The functionality may include adding moieties that tend to increase the solubility of the lignin in organic solvents and/or increase the dispersion of the modified lignin in a composite. The lignin that is modified may be lignin particles or mechanically reduced in size as described above for commercially available lignin or lignin going to a mechanical particle size reduction process. It is appreciated that lignin functionalized with the diazonium salt process described is not limited to functionalizing for purposes for use in tire applications but that the functionalized lignin can have other applications, including in combinations with other polymers. For example, the lignin may be functionalized through diazonium salt process such as described with a drug or other treatment agent. Such lignin can be added to a formulation to be administering to a mammal, such as a formulation including a biopolymer designed for controlled release of the treatment agent or sustained retention of the formulation at a treatment location.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. For example, a composite structure of a tire was described in which lignin was combined with styrene butadiene and possibly other fillers (e.g., carbon black). It is appreciated that a tire is one example of a composite structure. The lignin described herein can be combined with other materials. Reduced particle size lignin, modified or unmodified, can be used with other polymers as a reinforcing material. Examples include drug delivery (e.g., drug delivery devices or delivery agents such as controlled release formulations including biocompatible polymers), and molded plastic. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the FIGURES to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, FIGURE, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
   mechanically reducing a particle size of lignin particles to an average particle size less than 40 nanometers;
   after or during mechanically reducing the particle size, exposing lignin particles to a diazonium precursor comprising a functional group, thereby losing $N_2$ from the diazonium precursor and generating a radical form of the precursor, and then reacting the radical form with lignin particles; and
   after mechanically reducing the particle size, combining the lignin particles with a polymeric material.

2. The method of claim 1, wherein mechanically reducing lignin particles comprising mechanically reducing the particles to an average particle size of 10 nanometers or less.

3. The method of claim 1, wherein mechanically reducing comprises ball milling.

4. The method of claim 1, further comprising modifying the lignin particles to at least one of increase solubility in organic solvents and increase dispersion with rubber.

5. The method of claim 1, wherein the functional group is selected from the group consisting of an olefin, an epoxide, an ester, an acrylate, a halide, a thiol, a carbonate, a nitrile, and a carboxylic acid.

6. The method of claim 1, wherein combining comprises combining the lignin particles with the polymeric material and carbon black; and the method further comprises:
   modifying the lignin particles to at least one of increase solubility in organic solvents and increase blend dispersion with rubber.

7. The method of claim 1, wherein the polymeric material comprises rubber.

8. The method of claim 1, wherein exposing comprises providing the diazonium precursor in solution with an electrolyte.

9. The method of claim 1, wherein the polymeric material comprises rubber.

10. The method of claim 1, wherein the diazonium precursor comprises an organic aryl diazonium.

11. The method of claim 10, wherein the diazonium precursor further comprises a counterion.

12. The method of claim 11, wherein the counterion is a cation.

13. The method of claim 1, wherein reacting comprises reacting the radical form with an aryl group of the lignin particle.

14. The method of claim 1, wherein the lignin particle comprises lignosulfate, lignin ester, or silylated lignin.

15. The method of claim 1, wherein the polymeric material comprises a biocompatible polymer or a biopolymer.

16. The method of claim 1, wherein exposing comprises addition of an acid solution.

17. The method of claim 1, further comprising, after the combining, forming a structure of the combination.

18. The method of claim 17, wherein the structure is a tire.

19. The method of claim 17, wherein the structure comprises from 5 parts lignin per hundred rubber to 60 parts lignin per hundred rubber.

* * * * *